No. 788,745. Patented May 2, 1905.

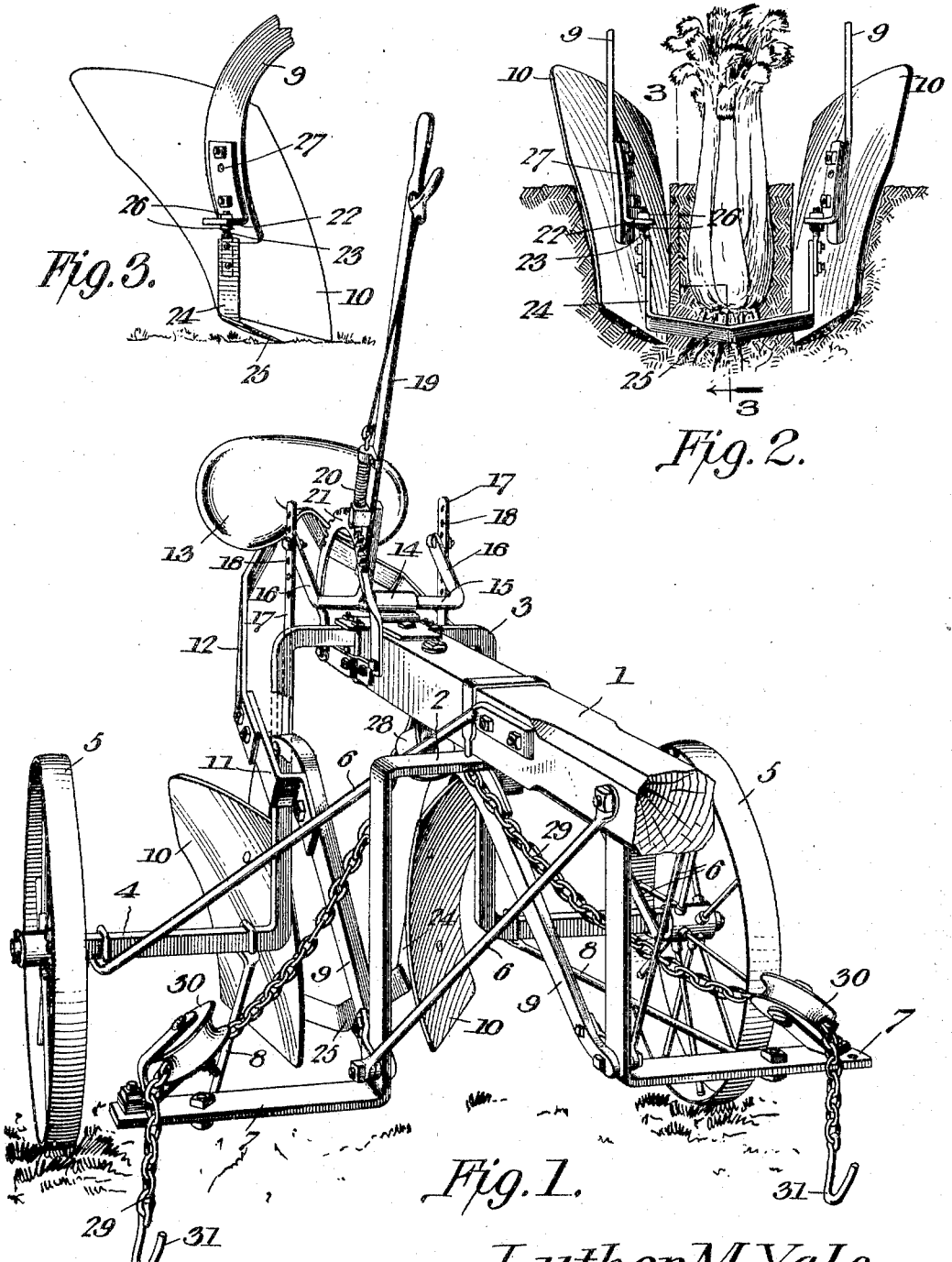

UNITED STATES PATENT OFFICE.

LUTHER M. YALE, OF CEDARFALLS, IOWA.

CELERY-DIGGER.

SPECIFICATION forming part of Letters Patent No. 788,745, dated May 2, 1905.

Application filed December 6, 1904. Serial No. 235,729.

*To all whom it may concern:*

Be it known that I, LUTHER M. YALE, a citizen of the United States, residing at Cedarfalls, in the county of Blackhawk and State of Iowa, have invented a new and useful Celery-Digger, of which the following is a specification.

This invention relates to an improved special machine for the purpose of digging celery, the object of the invention being to enable celery when cultivated on a large scale to be easily and conveniently dug or loosened, so as to permit its removal from the ground to be very easily performed.

Celery, as usually grown, is set in long rows or trenches. When it is ready for the harvest, it has been customary with a single plow to cut trenches alongside a row of grown plants, which have thus been left standing in a pronounced ridge. This ridge has afterward been loosened by means of heavy forks, which have been inserted under the plants and manipulated so as to loosen the latter, which have subsequently been gathered by hand. This process of gathering has involved the necessity for much labor, together with the expense and loss of time occasioned thereby. By this invention is provided a simple and inexpensive machine whereby two trenches are simultaneously formed alongside the row of plants and whereby at the same time a cutter operating beneath the soil serves to sever the filamentous roots of the plants, thereby enabling the latter to be readily lifted from the soil when gathered, and thus accomplishing a very important saving in the heaviest part of the work.

The invention consists in the improved construction and novel arrangement and combination of parts which will be hereinafter fully described, and particularly pointed out in the claims.

In the accompanying drawings has been illustrated a simple and preferred form of embodiment of the invention, it being, however, understood that no limitation is necessarily made to the precise structural details therein exhibited, but that the right is reserved to any changes, alterations, and modifications to which recourse may be had within the scope of the invention and without departing from the spirit or sacrificing the efficiency of the same.

In said drawings, Figure 1 is a perspective view of a machine constructed in accordance with the principles of the invention. Fig. 2 is a detail rear view. Fig. 3 is a sectional detail view taken on the line 3 3 in Fig. 2.

Corresponding parts in the several figures are indicated by like characters of reference.

The frame of the machine includes a draft-beam 1, with which are securely connected two arches 2 and 3, the latter being disposed near the rear end of the beam and the former a suitable distance in front of the rear arch. The rear arch is provided with laterally-extending arms or spindles 4, upon which the wheels 5 are journaled. Each of the arches is connected with the beam by means of obliquely-disposed braces 6 for the purpose of insuring the necessary strength and stability. The front arch 2 is provided with laterally-extending arms 7, and these arms may be connected with the arms 4 of the rear arch by means of braces 8. Pivotally connected with the front arch are plow-beams 9, the standards of which carry blades or furrow-openers 10, which may be of any desired and appropriate construction, said furrow-openers being suitably spaced apart to enable them to operate on opposite sides of the row of plants, as will be clearly seen in Fig. 2 of the drawings. It is obviously unnecessary that wide furrows should be opened, and the furrow-openers are therefore preferably constructed in such a manner as to make narrow but comparatively deep fissures in the ground. It is also not absolutely necessary that the soil should be turned as in plowing. A portion of the soil, of course, will be excavated and turned; but a portion may be simply displaced laterally, as will be readily understood. I do not, however, limit myself to any particular construction of furrow-openers, as many different devices of this kind may be used with equally satisfactory results.

The plow-beams 9 are provided with brackets 11, which engage the arms of the rear arch 3 and serve as guides to prevent lateral displacement of the plows. Suitably connected with the brackets 11 are the ends of the arms of a yoke 12, carrying a seat 13, which latter is thus directly borne by the plow-beams, so that the weight of the driver can be utilized in forcing the plows or furrow-openers into the ground.

The beam 1 is provided at its rear end with a bearing 14, in which is journaled a rock-shaft 15, having cranks 16, which are connected, by means of links 17, with the plow-beams, said links being provided each with a plurality of perforations 18 in order to enable them to be adjustably connected with the cranks 16. The rock-shaft 15 is provided with a lever 19, having a spring-actuated catch 20 engaging a suitably-supported rack-segment 21, whereby the lever and rock-shaft may be retained in adjusted position. By means of this lever the furrow-openers may be raised or lowered to any desired extent.

The blades or furrow-openers are provided on their rear sides with brackets 22, which are perforated for the passage of bolt members 23, extending upwardly from the ends of a cutter 24, which latter comprises an approximately V-shaped blade 25, the ends of which are upturned and provided with the aforesaid bolt members 23, which extend through the apertured brackets 22 and are there secured to adjusting-nuts 26. The brackets 22 are also preferably provided with auxiliary bolt-holes 27 to enable them to be vertically adjusted for the purpose of increasing the range of adjustment of the cutter. The latter, it will thus be observed, may be adjusted at the proper depth to cause it to sever the filamentous roots of the plants that are being operated upon.

Suitably connected with the beam at a point in rear of the front arch 2 is a sheave 28, over which passes a chain or other flexible draft member 29, which is guided over sheaves 30, supported at or near the ends of the arms 7 of the front arch 2, the ends of said draft member being provided with hooks 31 or other suitable means for the attachment of draft. It will be observed that the member 29, passing over the sheaves 28 and 30, forms a complete equalizer and that by the use thereof a doubletree is dispensed with, thus avoiding injury to the plants.

From the foregoing description, taken in connection with the accompanying drawings, the operation and advantages of this invention will be readily understood. The machine may be conveniently guided in such a manner as to cut narrow trenches of a sufficient depth adjacent to the row of plants, the weight of the driver being utilized in holding the furrow-openers in the ground at the necessary depth. At the same time the roots of the plants are severed by the blade 25 of the cutter, which latter may be adjusted so as to operate at the proper depth. Thus it will be seen that by a single operation of the machine the plants are completely loosened, so as to enable them to be easily removed in the ordinary manner.

The root-cutting blade may be of any desired construction; but it is preferred to make it approximately V-shaped, as herein described, in order to enable it to cut readily through the soil. It will also be found preferable to set the said blade at an incline, as will be clearly seen in Fig. 3 of the drawings, when it will have a tendency to push the plants in an upward direction, thereby loosening said plants and facilitating their subsequent removal.

Having thus described the invention, what is claimed is—

1. In a machine of the class described, a beam, two arches connected with said beam, plow-carrying beams connected pivotally with the front arch, guide members connected with the plow-beams and engaging the rear arch, and a seat-carrying yoke connected with said guide members.

2. In a machine of the class described, a pair of suitably-supported arches, transporting-wheels connected with the rear arch, furrow-opener-carrying beams connected pivotally with the front arch and having guide members engaging the rear arch, and means for vertically adjusting said beams.

3. In a machine of the class described, a main beam, a pair of arches connected with said beam and having laterally-extending arms, transporting-wheels journaled upon the arms of the rear arch, furrow-opener-carrying beams connected pivotally with the front arch, and a subsoiling-cutter connected with the furrow-openers.

4. In a machine of the class described, a pair of furrow-openers, brackets upon the rear sides of said furrow-openers, and a root-severing cutter having arms adjustably engaging said brackets.

5. In a machine of the class described, a pair of furrow-openers, a root-severing cutter connected adjustably with said furrow-openers, beams carrying the furrow-openers, pivotal supporting means for said beams, and means for vertically adjusting the latter.

6. In a machine of the class described, a beam, a pair of arches connected with said beam and having laterally-extending arms, transporting-wheels journaled upon the arms of the rear arch, furrow-opener-carrying beams connected pivotally with the front arch and having guides engaging the rear arch, a seat-carrying yoke connected with said guides, a rock-shaft journaled upon the main beam and having cranks, links connecting said cranks with the beams carrying the furrow-openers, and means for manipulating the rock-shaft.

7. In a machine of the class described, a main beam, a pair of arches connected with said beam and having laterally-extending arms, transporting-wheels journaled upon the arms of the rear arch, furrow-opener-carrying beams connected pivotally with the front arch and having guide members engaging the rear arch, a sheave supported under the main beam, sheaves supported by the arms of the front arch, and a flexible draft member engaging the several sheaves.

In testimony that I claim the foregoing as my own I have hereto affixed my signature in the presence of two witnesses.

LUTHER M. YALE.

Witnesses:
H. W. JOHNSON,
JULIA S. DICKSON.